United States Patent
Wang et al.

(10) Patent No.: US 9,363,819 B2
(45) Date of Patent: Jun. 7, 2016

(54) MACHINE TO MACHINE (M2M) FRAME WITHIN A FRAME

(75) Inventors: Lei Wang, San Diego, CA (US); Ronald G. Murias, Calgary (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 273 days.

(21) Appl. No.: 13/984,270

(22) PCT Filed: Feb. 9, 2012

(86) PCT No.: PCT/US2012/024472
§ 371 (c)(1),
(2), (4) Date: Oct. 17, 2013

(87) PCT Pub. No.: WO2012/109439
PCT Pub. Date: Aug. 16, 2012

(65) Prior Publication Data
US 2014/0029568 A1    Jan. 30, 2014

Related U.S. Application Data (60) Provisional application No. 61/441,119, filed on Feb. 9, 2011.

(51) Int. Cl.
| | | |
|---|---|---|
| H04W 72/08 | (2009.01) | |
| H04W 72/04 | (2009.01) | |
| H04J 1/02 | (2006.01) | |
| H04J 3/16 | (2006.01) | |
| H04L 5/00 | (2006.01) | |
| H04L 5/14 | (2006.01) | |

(52) U.S. Cl.
CPC .............. *H04W 72/087* (2013.01); *H04J 1/02* (2013.01); *H04J 3/1694* (2013.01); *H04L 5/0039* (2013.01); *H04L 5/0044* (2013.01); *H04L 5/0053* (2013.01); *H04W 72/04* (2013.01); *H04L 5/0048* (2013.01); *H04L 5/1469* (2013.01)

(58) Field of Classification Search
None
See application file for complete search history.

(56) References Cited

U.S. PATENT DOCUMENTS

| | | | |
|---|---|---|---|
| 2012/0176975 A1* | 7/2012 | Choi et al. | 370/329 |
| 2012/0178464 A1* | 7/2012 | Li et al. | 455/450 |

OTHER PUBLICATIONS

Alcatel-Lucent, M2M Communication, 3GPP TSG-RAN-WG1 Meeting #54bis, Prague, Czech Republic, Sep. 29-Oct. 3.
Huawei Technologies Co., Ltd, The Way Forward on M2M Discussion in GERAN, 3GPP TSG GERAN #46, Jeju, South Korea, May 17-21, 2010, TDoc GP-100758.
ZTE, Discussion on MTC Features priorityes, 3GPP TSG-RAN-WG2 Meeting #69bis, Prague, Czech Republic, Sep. 29-Oct. 3.
Draft Amendment to IEEE Standard for Local and metropolitan area networks; Part 16: Air Interface for Broadband Wireless Access Systemsl Advanced Air Interface, IEEE P802.16m/D11 (Jan. 27, 2011).

(Continued)

*Primary Examiner* — Jae Y Lee
*Assistant Examiner* — Alan Lindenbaum
(74) *Attorney, Agent, or Firm* — Condo Roccia Koptiw LLP (57) ABSTRACT

A method for use in a wireless communications system includes transmitting M2M signals in an allocated narrow portion of bandwidth in a wideband structure. The allocated portion of the bandwidth may be allocated to narrow band M2M (NB-M2M) devices using a low complexity narrowband technology to access a frame structure within an existing wideband deployment.

18 Claims, 10 Drawing Sheets

(56) References Cited

OTHER PUBLICATIONS

IEEE Standard for Local and metropolitan area networks; Part 16: Air Interface for Broadband Wireless Access Systems, IEEE Std. 80216-2009 (May 29, 2009).
IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std 802.16e-2005 and IEEE Std 80216-2004/Cor1-2005 (Feb. 28, 2006).
Jung et al., "IEEE 802.16p Machine to Machine (M2M) System Requirements Document (SRD)," IEEE 802.16 Broadband Wireless Access Working Group, IEEE 802.16p-10/0004r3 (Sep. 29, 2011).
Third Generation Partnership Project, "Technical Specification Group Radio Access Network; Evolved Universal Terrestrial Radio Access (E-UTRA); LTE Physical Layer—General Description (Release 8)," 3GPP TS 36.201 V8.3.0 (Mar. 2009).
Third Generation Partnership Project, "Technical Specification Group Radio Access Network; Evolved Universal Terrestrial Radio Access (E-UTRA); LTE physical layer; General description (Release 9)," 3GPP TS 36.201 V9.1.0 (Mar. 2010).
Third Generation Partnership Project, "Technical Specification Group Radio Access Network; Evolved Universal Terrestrial Radio Access (E-UTRA); LTE physical layer; General description (Release 10)," 3GPP TS 36.201 V10.0.0 (Dec. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical channels and modulation (Release 10)," 3GPP TS 36.211 V10.0.0 (Dec. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.0.0 (Dec. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.4.0 (Dec. 2011).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.0.1 (Dec. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.4.0 (Dec. 2011).
Third Generation Partnership Project, "Technical Specification Group Services and System Aspects; System Improvements for Machine-Type Communications; (Release 11)," 3GPP TR 23.888 V1.0.0 (Jul. 2010).
Third Generation Partnership Project, "Technical Specification Group Services and System Aspects; System Improvements for Machine-Type Communications; (Release 11)," 3GPP TR 23.888 V1.2.0 (Apr. 2011).
Third Generation Partnership Project, "Technical Specification Group Services and System Aspects; System Improvements for Machine-Type Communications (Release 11)," 3GPP TR 23.888 V1.6.1 (Feb. 2012).
ZTE, Discussion on MTC Features priorities, 3GPP TSG-RAN-WG@ Meeting #69bis, Prague, Czech Republic, Sep. 29-Oct. 3.

* cited by examiner

| PARAMETER | VALUE | NOTES |
|---|---|---|
| NUMBER OF DC SUBCARRIERS | 1 | – |
| NUMBER OF GUARD SUBCARRIERS, LEFT | 10 | – |
| NUMBER OF GUARD SUBCARRIERS, RIGHT | 9 | – |
| NUMBER OF USED SUBCARRIERS ($N_{USED}$) INCLUDING ALL POSSIBLE ALLOCATED PILOTS AND THE DC SUBCARRIER) | 109 | – |
| NUMBER OF PILOT SUBCARRIERS | 9 | – |
| PILOT SUBCARRIER INDEX | $9k+3m+1$, FOR $k=0, 1...11$ AND $m=$[SYMBOL INDEX] MOD 3 | SYMBOL OF INDEX 0 IN PILOT SUBCARRIER INDEX SHOULD BE THE FIRST SYMBOL OF THE CURRENT ZONE. m IS INCREMENTED ONLY FOR DATA SYMBOLS, EXCLUDING PREAMBLES, SAFETY ZONES, SOUNDING SYMBOLS, MIDAMBLES, ETC. |
| NUMBER OF DATA SUBCARRIERS | 96 | – |
| NUMBER OF PHYSICAL BANDS | 3 | – |
| NUMBER OF BINS PER PHYSICAL BAND | 4 | – |
| NUMBER OF DATA SUBCARRIERS PER SLOT | 48 | – |

MACHINE TO MACHINE (M2M) FRAME WITHIN A FRAME

CROSS REFERENCE TO RELATED APPLICATION

This application claims the benefit of U.S. Patent Application No. 61/441,119, filed Feb. 9, 2011, and PCT application No. PCT/US2012/024472, filed Feb. 9, 2012, the contents of which are hereby incorporated by reference herein.

FIELD OF INVENTION

This application is related to wireless communications.

BACKGROUND

Machine to Machine (M2M) devices may use a lower complexity narrowband technology to access a frame structure within an existing wideband deployment. In such a deployment, a base station may allocate a narrow part of the spectrum specifically for M2M use.

By embedding a narrowband structure inside a wideband structure, a base station may manage low bandwidth M2M along with regular network use, while the M2M devices may be made less complex and with lower power consumption and lower cost than full-band devices.

M2M devices that process narrow band radio frequency (RF) channels may be referred to as Narrow-Band M2M (NB-M2M) Devices. M2M devices may belong to one of the following three classes based on their capability of band processing: (1) Narrow-band only M2M devices that may only process narrow band (e.g., 1.25 MHz or 1.08 MHz); (2) Wide-band only M2M devices; or (3) Capable of processing both narrow-band and wide-band, but one at a time, i.e. configurable where the wide-band capability may be limited to some specific cases. For example, 2994298-1 an M2M device capable of processing both narrow-band and wide-band may use wide-band for network entry.

In general, base station (BS) support for NB-M2M operations may include the following: (1) a BS scheduler may allocate the M2M regions to meet the quality of service (QoS) requirements for M2M traffic and also to minimize the impact on non-M2M devices; (2) a BS may provide NB-M2M region specific PHY support, (for example, NB-M2M region PHY synchronization signals, downlink/uplink (DL/UL) control signals, such as MAPs, UL ranging and feedback, and data bursts); and (3) a BS may provide the NB-M2M device specific MAC support to improve the system efficiency for NB-M2M operation, (for example, M2M device specific bandwidth management and allocation mechanisms, M2M device specific power saving procedures with long sleep/idle intervals). The BS may be a logical node in wireless communication systems that facilitates wireless communication between a subscriber station (SS)/wireless transmit/receive unit (WTRU) and a network.

SUMMARY

A method for use in a wireless communications system includes transmitting M2M signals in an allocated narrow portion of bandwidth in a wideband structure, wherein the allocated portion of the bandwidth is allocated to narrow band M2M (NB-M2M) devices using a low complexity narrowband technology to access a frame structure within an existing wideband deployment.

BRIEF DESCRIPTION OF THE DRAWINGS

A more detailed understanding may be had from the following description, given by way of example in conjunction with the accompanying drawings wherein.

DETAILED DESCRIPTION

Figure 1A:
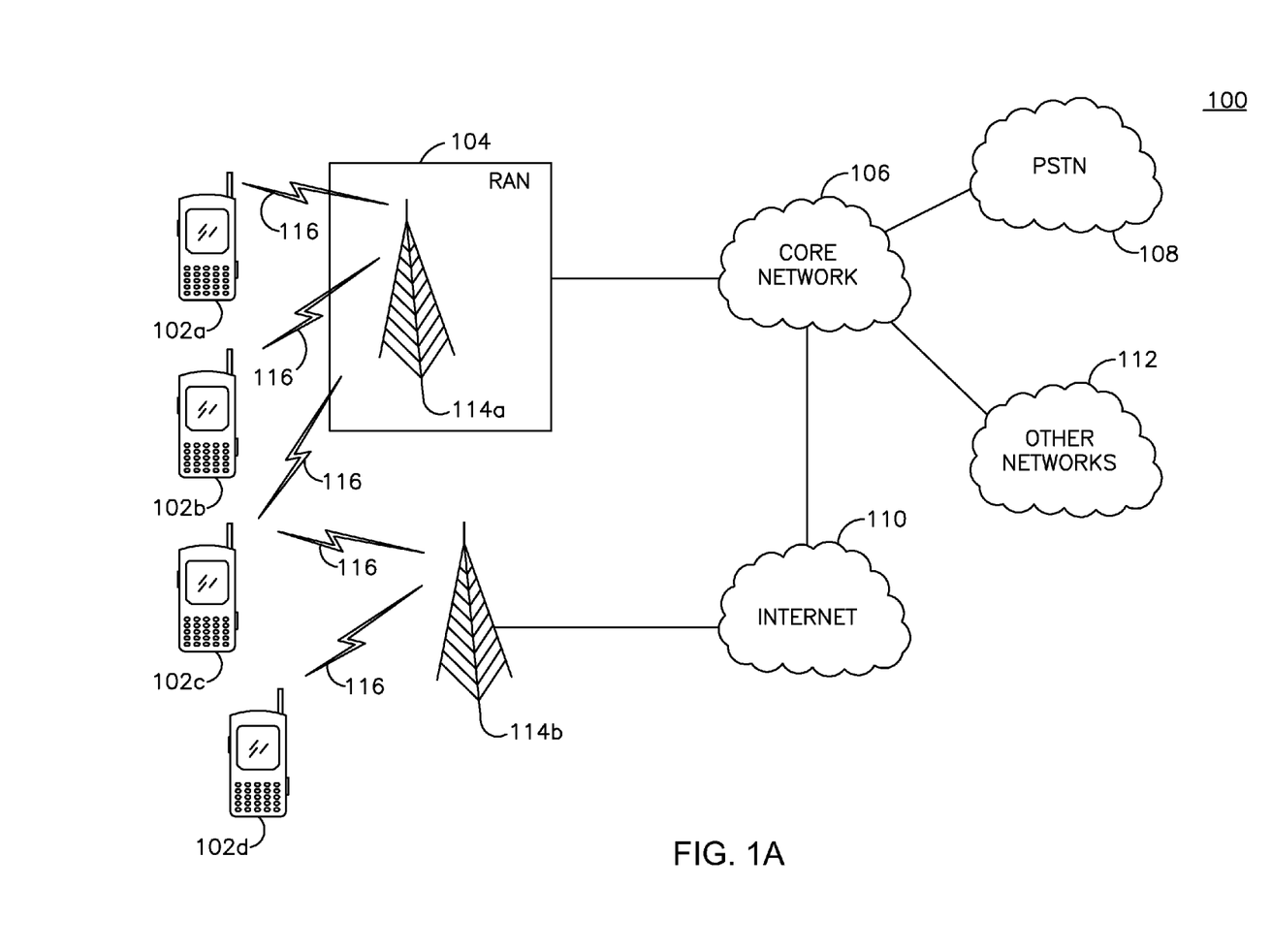
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
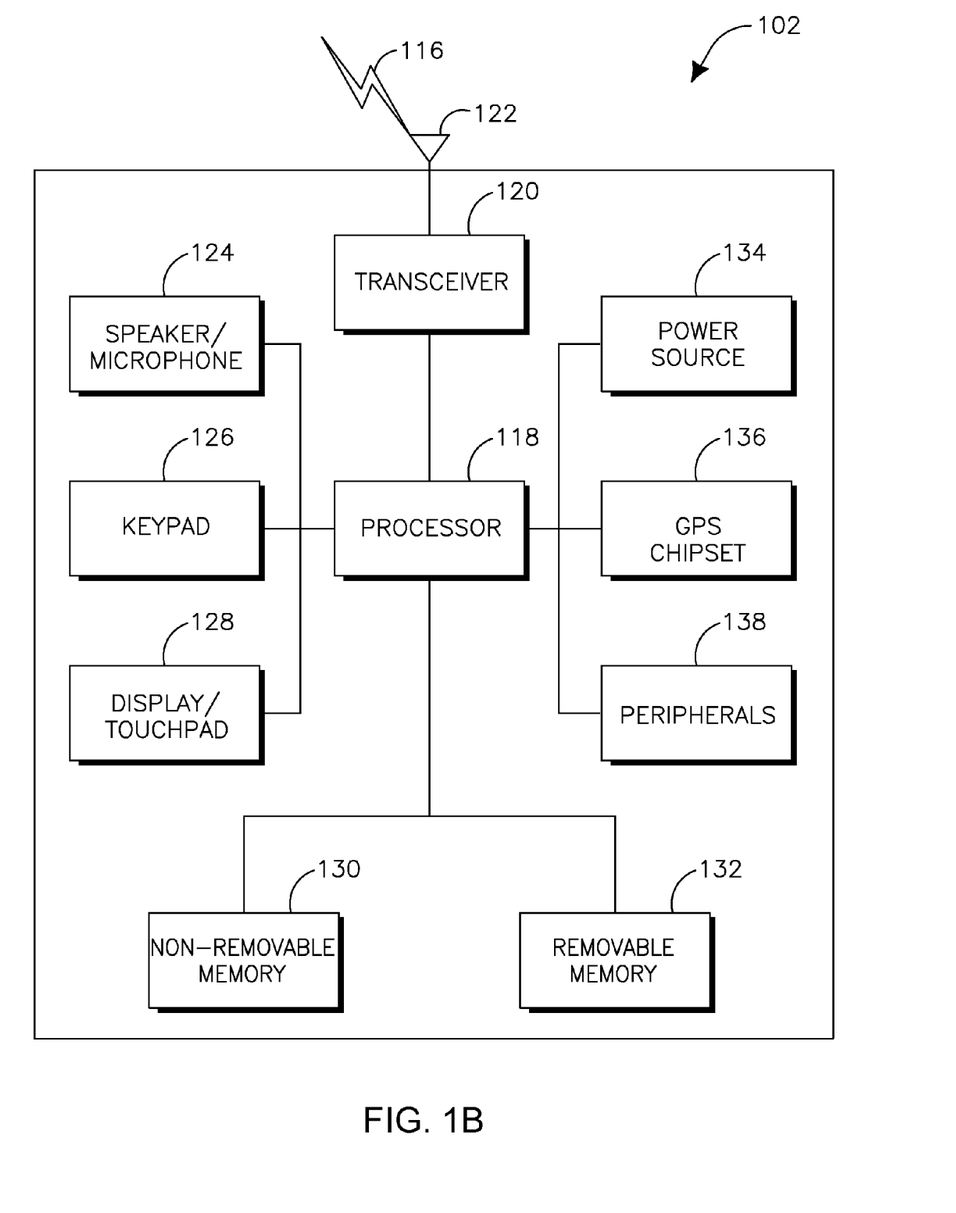
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
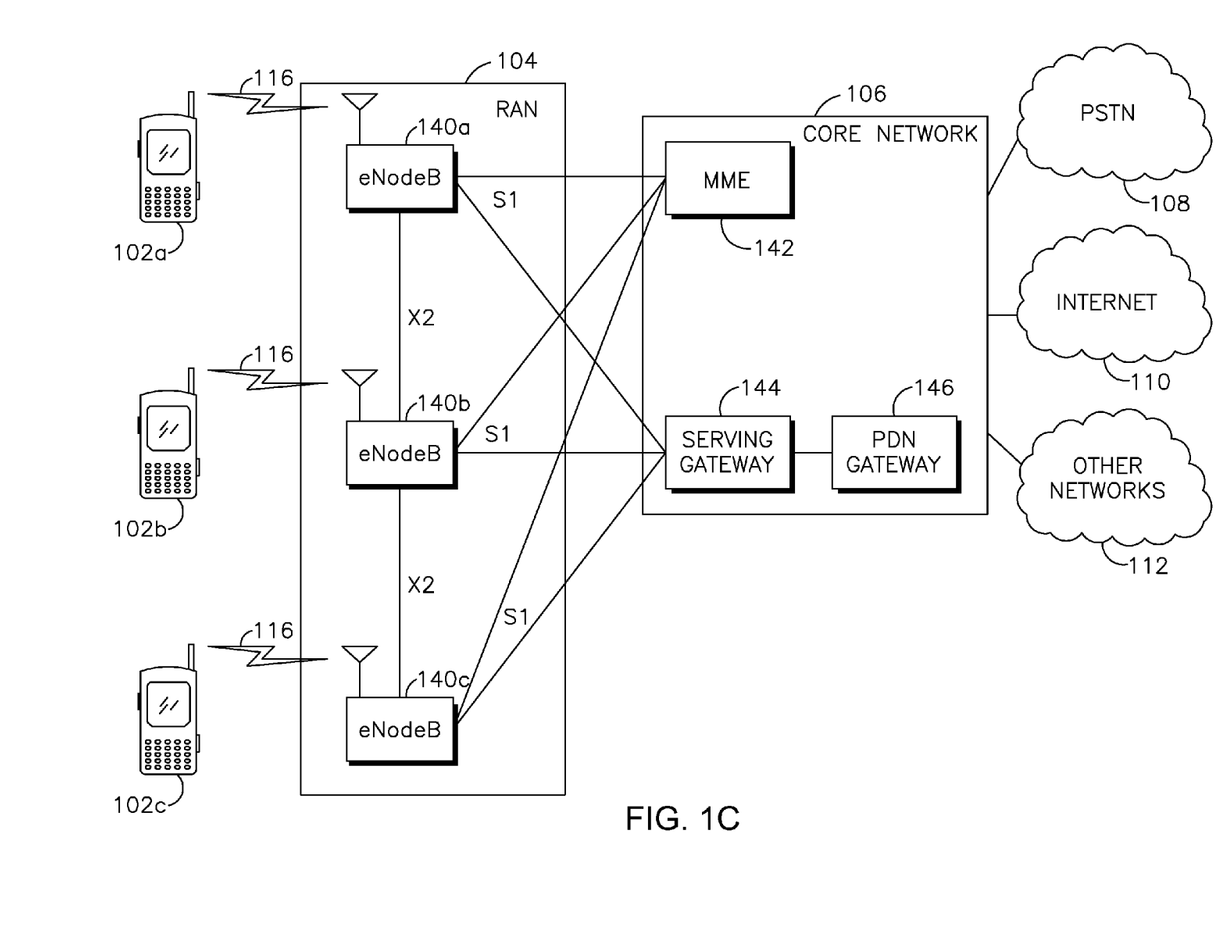
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A Machine to Machine (M2M) device may be configured to use a low complexity narrowband technology to access a frame structure within an existing wideband deployment. More specifically, a base station may be configured to allocate a narrow part of the spectrum specifically for M2M use. By embedding a narrowband structure inside a wideband structure, one base station may manage low bandwidth M2M along with regular network use, while the M2M devices may be made less complex and with lower power consumption and lower cost than full-band devices.

M2M devices that process narrow band radio frequency (RF) channels may be referred to as Narrow-Band M2M (NB-M2M) Devices. M2M devices may belong to one of the following three classes based on their capability of band processing: (1) Narrow-band only M2M devices that may only process narrow band (e.g., 1.25 MHz or 1.08 MHz); (2) Wide-band only M2M devices; or (3) Capable of processing both narrow-band and wide-band, but one at a time, i.e. configurable where the wide-band capability may be limited to some specific cases. For example, an M2M device capable of processing both narrow-band and wide-band may use wide-band for network entry.

In general, base station (BS) support for NB-M2M operations may include the following: (1) a BS scheduler may allocate the M2M regions to meet the quality of service (QoS) requirements for M2M traffic and also to minimize the impact on non-M2M devices; (2) a BS may provide NB-M2M region specific PHY support, (for example, NB-M2M region PHY synchronization signals, downlink/uplink (DL/UL) control signals, such as, MAPs, UL ranging and feedback, and data bursts); and (3) a BS may provide the NB-M2M device specific MAC support to improve the system efficiency for NB-M2M operation, (for example, M2M device specific bandwidth management and allocation mechanisms, M2M device specific power saving procedures with long sleep/idle intervals). The BS may be a logical node in wireless communication systems that facilitates wireless communication between a subscriber station (SS)/wireless transmit/receive unit (WTRU) and a network. For example, a logical node may be NB/eNB in 3GPP systems or BS/ABS in 802.16 systems.

Some existing multicarrier systems may use a fixed subcarrier spacing that may be independent of the bandwidth in use. Fixed subcarrier spacing (either 15 kHz or 7.5 kHz in the case of LTE) generally means that a radio operating in a 1.25 MHz band would have subcarriers spaced the same distance apart as a radio operating in a 20 MHz band. One difference between the two radios is that the radio operating in the 1.25 MHz band operates with a sample rate 16 times slower than the radio operating in the 20 MHz band. Another difference between the two is that the narrower band allows for a less expensive radio as well as a less complex and lower power baseband processor (e.g. 128 point FFT instead of a 2048 point FFT).

Figure 2:
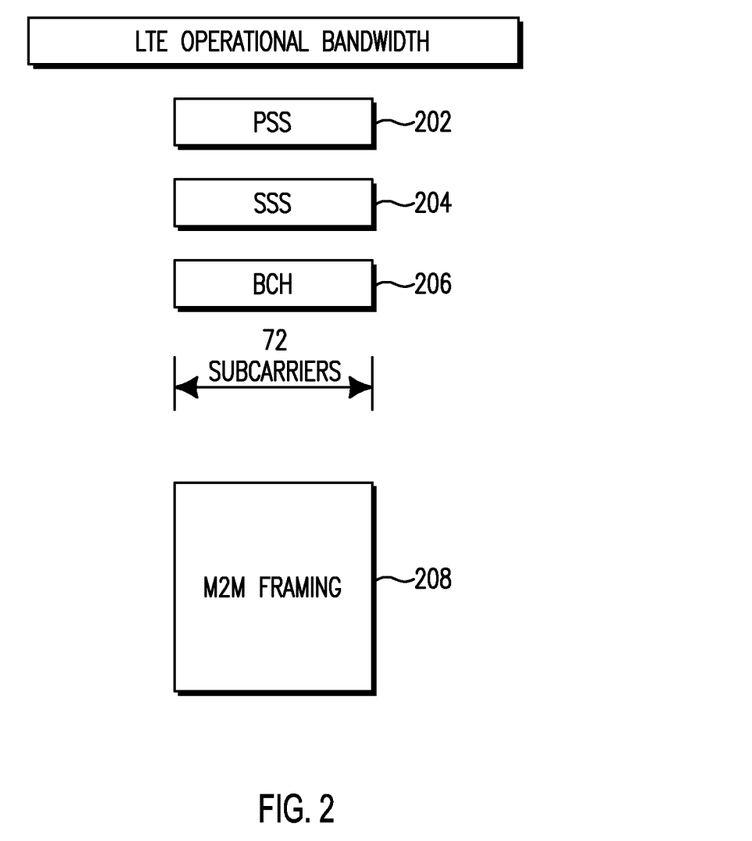
FIG. 2 is an example of M2M frame-within-a-frame for LTE.

In other multicarrier systems, the preamble and synchronization process may be confined to the "center" 72 carriers, with a primary synchronization signal (PSS), a secondary synchronization signal (SSS), and a broadcast channel (BCH) all confined to this area. If the M2M devices are tuned to this part of the band, they may receive the same information as their full-bandwidth counterparts. Following this, an M2M-specific frame structure may remain on these center carriers, while other resources can be allocated to wideband devices. FIG. 2 illustrates an example of M2M frame-within-a-frame for LTE.

The smallest specified channel bandwidth for LTE, for example, may be 1.4 MHz; (using 6 resource blocks). Using localized subcarrier allocations, downlink (OFDM) and uplink (DFTS-OFDM) transmissions for M2M devices may be limited to the same inner 72 subcarriers (6 resource blocks) used for PSS 202, SSS 204, and BCH 206. Some higher layer frame planning may be required to allow the M2M specific frames 208 to coexist with regular data frames.

Figure 3:
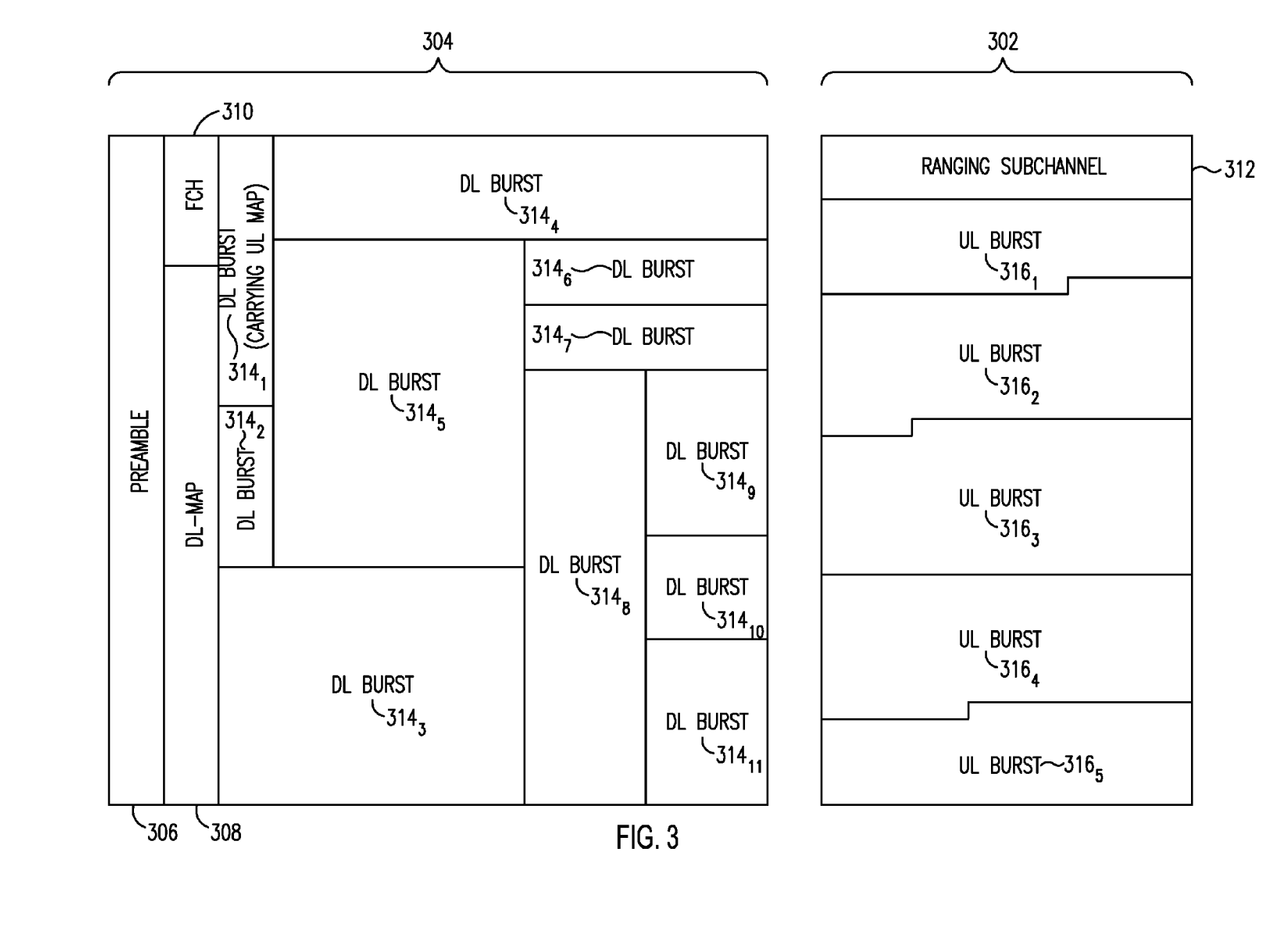
FIG. 3 is an example of 802.16e OFDMA TDD frame structure with only mandatory zone.

Similarly, FIG. 3 illustrates an example of 802.16e OFDMA (Orthogonal Frequency Division Multiplexing Access) TDD (Time Division Duplex) frame structure with only mandatory zone. The frames show uplink 302, and downlink 304, as well as the preamble 306, DL-MAP 308, FCH 310, ranging channel 312, and bursts including, for example, DL bursts $314_{1-11}$ and UL bursts $316_{1-5}$. A separate synchronization signal (not shown) may be required for the M2M devices because an 802.16 preamble may span the entire wide band. For the downlink in an 802.16e system, subcarrier mapping such as Band Adaptive Modulation and Coding (Band AMC) may be used to allocate a portion of the bandwidth to narrowband M2M devices. In this case, the regular frame structure may be used, but once the mandatory transmissions are complete, the M2M preamble may be sent and any downlink transmissions specific to M2M devices may be identified by a special M2M MAP, followed by the data. Similarly, M2M uplink space within the special narrow band may be allocated by the base station and used by the M2M devices.

Figure 4:
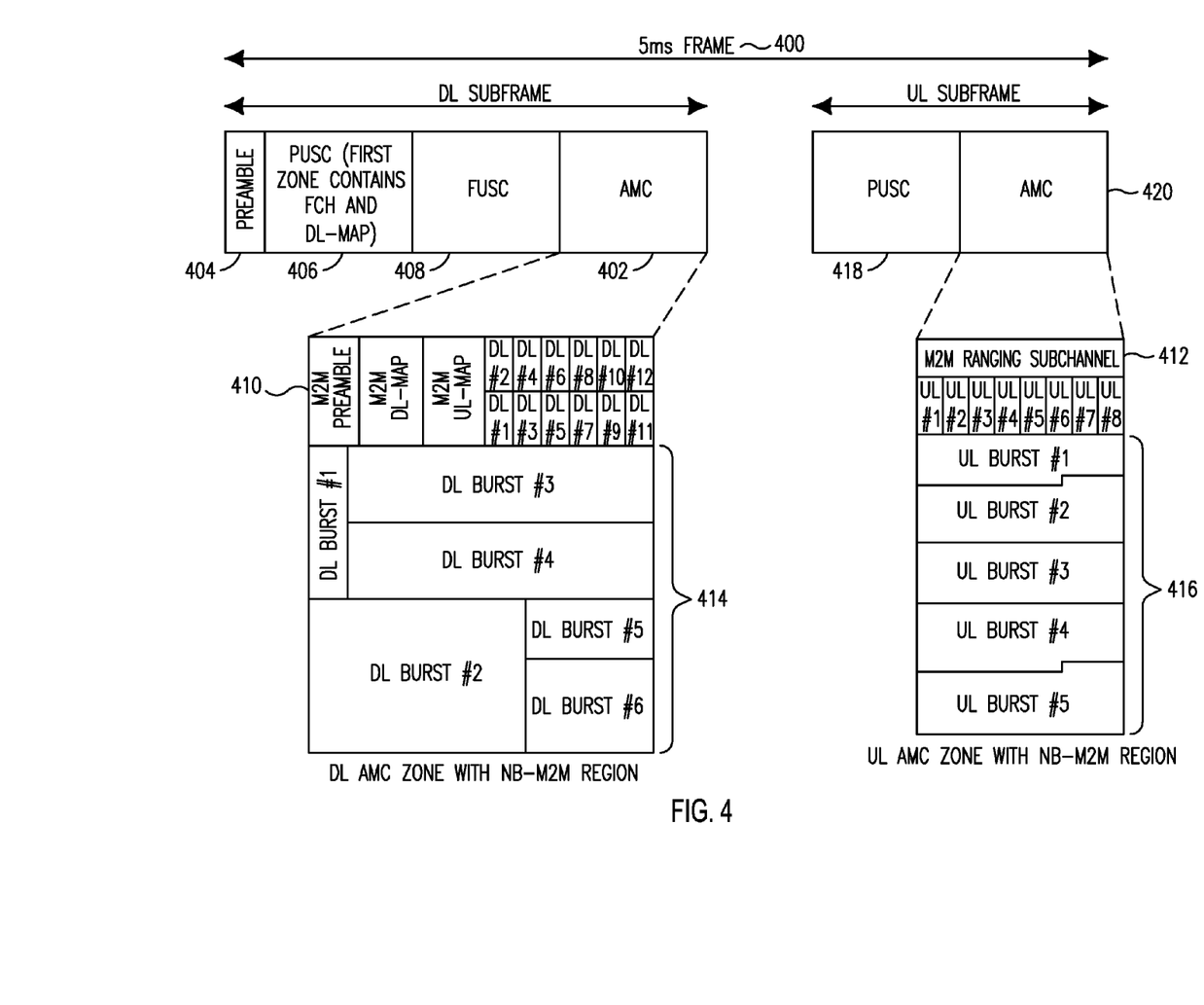
FIG. 4 is an example of 802.16e TDD frame structure with NB-M2M region allocated in AMC zone.

FIG. 4 illustrates an example of 802.16e TDD frame structure 400 with NB-M2M region allocated AMC zone 402, as well as the preamble 404, partial usage of sub-carriers (PUSC) zone 406, full usage of sub-carriers (FUSC) 408, and corresponding uplink PUSC and AMC zones 418, 420. Bursts 414, 416 are also shown. An issue that may require parameter adjustment is the subcarrier spacing used for various bandwidths in 802.16e. The sampling frequency, $F_s$, is calculated as follows: $F_s$=floor (n·BW/8000)·8000, where n is the sampling factor. For bandwidths 1.25 MHz, 5 MHz, 10 MHz, and 20 MHz, this sampling factor is the same: 28/25. Subcarrier spacing is calculated as: $\Delta f = F_s/N_{FFT}$, where $N_{FFT}$ is the smallest power of two greater than the number of subcarriers in use, in this case, for 1.25 MHz, 5 MHz, 10 MHz, and 20 MHz, $N_{FFT}$ is 128, 512, 1024, and 2048, respectively.

For other bandwidths in 802.16e, the subcarrier spacing may not match the value for the 1.25 MHz band and changes to the parameters for these bands may be required.

For the M2M preamble 410 in the 802.16e configuration, if the existing 1.25 MHz parameters may be used, then the preamble defined for the 1.25 MHz band may be embedded within the downlink frame to allow the M2M device to synchronize to the base station in the same manner currently defined in 802.16e. In the Uplink subframe, the M2M Ranging subchannel 412 may also be required.

FIG. 4 also shows an example of using a FDM (Frequency Division Multiplexing) way to accommodate both legacy wide-band traffic and narrow-band M2M traffic in an 802.16e frame. The presence of NB-M2M traffic in an 802.16e frame may also be supported in a TDM (Time Division Mulipexing) manner or a combined FDM and TDM manner. For example, a DL NB-M2M region may be allocated in full or in any portion of an AMC zone.

Figure 5:
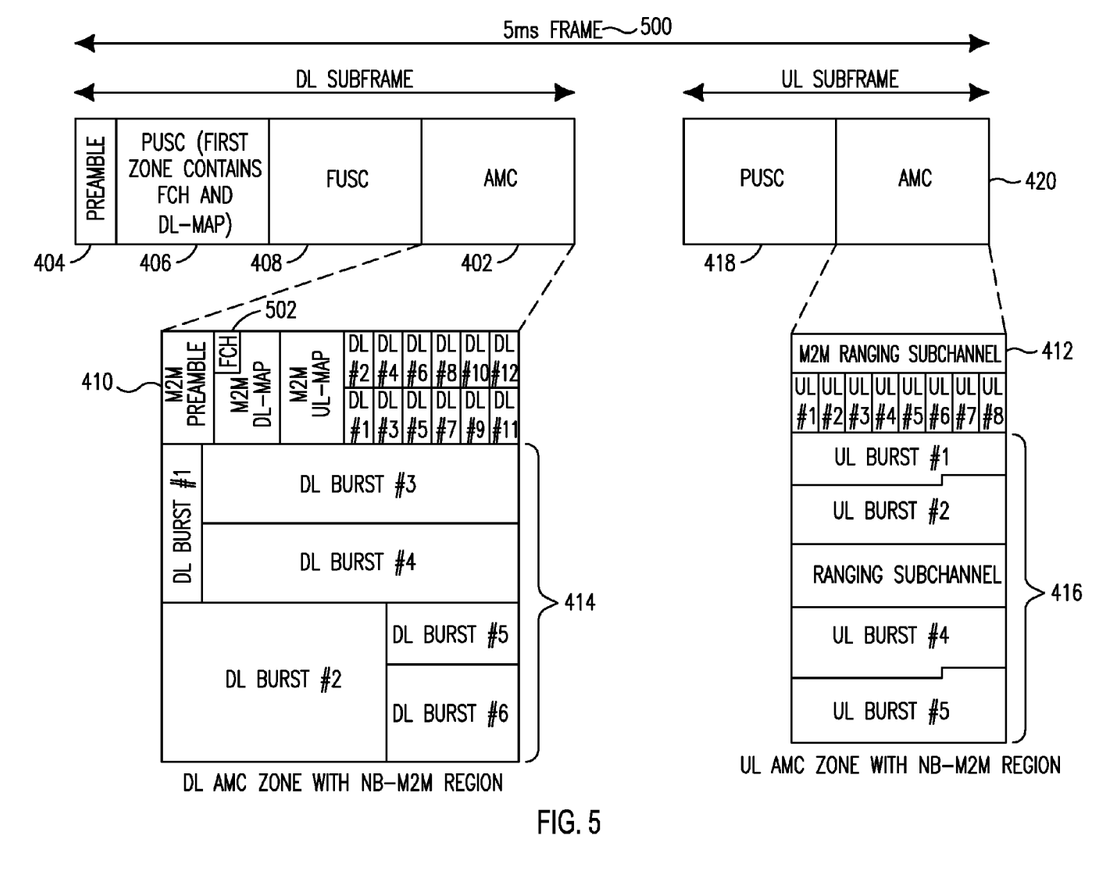
FIG. 5 is an example of 802.16e TDD frame structure with NB-M2M region allocated in AMC zone with FCH included in the NB-M2M region.

FIG. 5 illustrates an example of 802.16e TDD frame structure 500 with NB-M2M region allocated in AMC zone with Frame Control Header (FCH) 502 included in the NB-M2M region, for example, in the M2M DL-MAP, as shown. This is another example of using a FDM way to accommodate both legacy wide-band traffic and narrow-band M2M traffic in an 802.16e frame. In this case, an FCH is included in the frame to allow 802.16e narrow band mobile stations (MSs) to use this portion of the frame.

To support the NB-M2M operation in an 802.16e OFDMA system, the BS scheduler allocates NB-M2M regions in the 802.16e OFDMA frames, as shown in the example in FIG. 4. The available air link resource to the legacy 802.16e subscriber stations (SSs)/MSs is reduced due to the introduction of the NB-M2M region. However, such impact may be minimized by carefully scheduling such NB-M2M regions.

One way to minimize this impact is to have a traffic load dependant scheduling of the NB-M2M regions, with which the BS scheduler allocates the NB-M2M regions based on the traffic load of the legacy SSs/MSs, (i.e., the non-M2M traffic). For example, based on some predefined thresholds, the non-M2M traffic load may be classified as high, medium, and low. When the non-M2M traffic load is high, during peak hours, minimum NB-M2M regions are scheduled to meet the need of transporting the delay-sensitive M2M data, such as alarm/exception reporting. When the non-M2M traffic load is low (e.g., midnight), more NB-M2M regions are scheduled where the M2M data may be transported. Due to the long delay tolerance of select M2M applications, M2M data may be accumulated in the time-domain.

Figure 6:
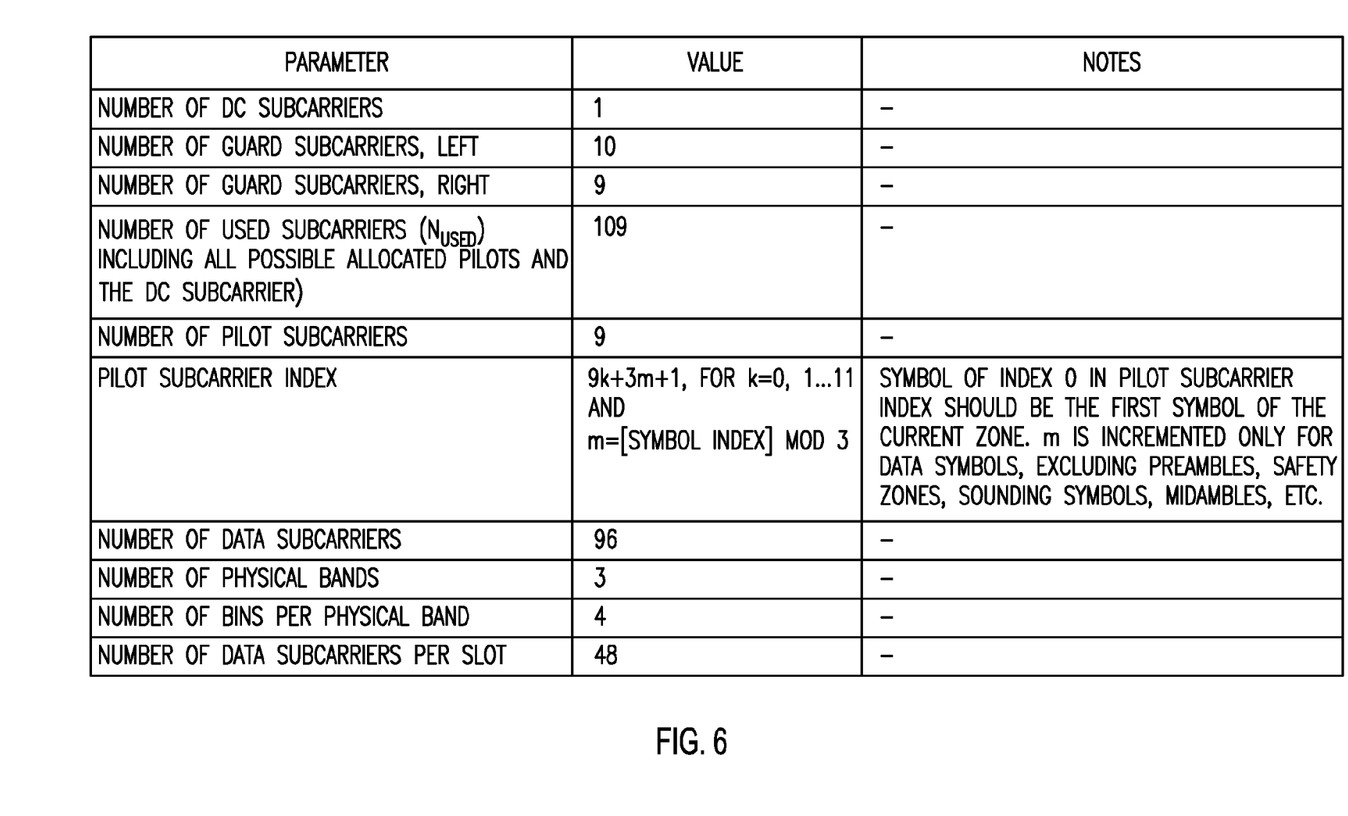
FIG. 6 is a table of 128 FFT OFDMA AMC subcarrier allocations.

FIG. 6 is a table of OFDMA AMC subcarrier allocations for the narrow-band (128 bin) case, and those parameters may be applied in both the DL and in the UL. The guard subcarriers are included to combat out-of-band emissions found in the typical OFDM signal. Although this may be an issue for the NB-M2M devices in the UL, the full band (all carriers except DC) may be used for the DL. This may cause an increase in spectral efficiency for the DL. The NB-M2M device may have an RF front end designed to allow the full spectrum and the baseband processor must process all 128 data points.

The synchronization signals defined for the 128-FFT mode of 802.16e may be re-used for the NB-M2M devices. For example, the preamble series for the 128-FFT mode, may be transmitted in the special NB-M2M subband. Rather than transmitting as the first symbol of the DL transmission, the NB-M2M preamble is transmitted as the first NB-M2M symbol in the allocated NB-M2M region (see FIG. 4). The preamble signal is described as: $PreambleCarrierSet_n = n + 3k$, where n is the preamble carrier set and k is a running index, 0-35 for the 128-FFT. This results in a preamble that uses every $3^{rd}$ subcarrier, and the subcarrier set depends on the preamble carrier set in use.

For UL ranging, the NB-M2M device uses the same mechanism defined for 802.16e 128-FFT devices. The location of the ranging channel is communicated to the NB-M2M MS through the NB-M2M UL MAP.

To balance the complexity at the 802.16e BS and the efficiency of the NB-M2M operation, one of the embodiments for the 802.16e BS MAC may support the NB-M2M. First, the MAC design, including MAC PDU, MAC control signals, MAC protocols, function modules and MAC procedures, may be used for the BS to support the NB-M2M devices with the traffic in the newly proposed NB-M2M regions. Second, the enhanced NB-M2M specific MAC designs and features may be introduced in an incremental manner at the 802.16e BS to improve the NB-M2M operation for the traffic in the NB-M2M region, with a proper capability negotiation between the BS and the NB-M2M devices.

The following MAC supports at the BS may be introduced for the NB-M2M operation, but are not limiting. A first MAC may support small-size MAC headers, extended headers, and control messages. For example, design a compressed MAC header format and MAC control messages just for M2M traffic only, (i.e. remove all the unnecessary fields for 802.16e legacy traffic).

A second MAC may use NB-M2M Specific MAC addresses and identifiers. For example, using time-division to activate different groups of M2M devices so that the number of simultaneously active M2M devices can be reduced, thus resulting in a smaller size of address field and/or identifiers. Some address translation/mapping mechanisms can be considered to maintain the correspondences between the original but long addresses/identifiers and the compressed addresses/identifiers used at the MAC layer for the active M2M devices.

A third MAC may use enhanced power saving mechanisms. For example, allowing long sleep/idle intervals, requiring no or minimal paging, introducing new subscriber states and state machines just for M2M devices.

A fourth MAC may use enhanced network reentry procedure for M2M devices. For example, allowing different handlings for the M2M device resource retention timer so that the M2M device context information can be retained at the BS/network with long inactive time periods. In addition, under the consideration of high delay tolerance of certain M2M data, using pre-assigned time and/or frequency to different M2M devices or groups of M2M devices to spread the network reentry requests in a managed manner so that a better system loading balance can be achieved and the collision probability in the network re-entry random access can be significantly reduced.

A fifth MAC may use enhanced random accesses for initial ranging, handover (HO) ranging, periodic ranging, and contention-based UL bandwidth request. For example, periodic ranging may be skipped or minimized due to highly concentrated data bursts from a M2M device during normal M2M operation. HO ranging may be skipped or minimized due to the consideration of M2M devices being fixed in location for certain M2M applications.

A sixth MAC may use enhanced UL bandwidth request/grant procedures for NB-M2M devices. For example, using a highly coordinated way between the network entry/reentry procedure and UL bandwidth request/grant procedure under the consideration that most UL traffic from M2M devices is during a short active period following network entry/re-entry.

In an 802.16e DL, for example, the resources may be allocated in the form of n symbols*m subchannels rectangle by DL MAP IEs. In the 802.16e UL, the resources are allocated by UL MAP IEs in the form of number of UL resource slots (e.g x symbols*1 subchannel, where x depends on the UL permutations zones). The DL/UL MAPs may be transmitted to and decoded by all the SSs/MSs, which means all the SSs/MSs know the sizes and locations of the DL/UL allocations. The 802.16e MSs/SSs may be designed to skip the DL/UL allocations that are not destined to them, and also in DL the 802.16e MSs/SSs may be designed to skip the DL allocations that they cannot receive/decode correctly.

While 802.16m systems enjoy the same fixed subcarrier spacing for the 5, 10, and 20 MHz bands, there is currently no prescribed structure for bandwidths smaller than 5 MHz. There are at least two options available that would allow NB-M2M devices to operate with an 802.16m BS.

Figure 7:
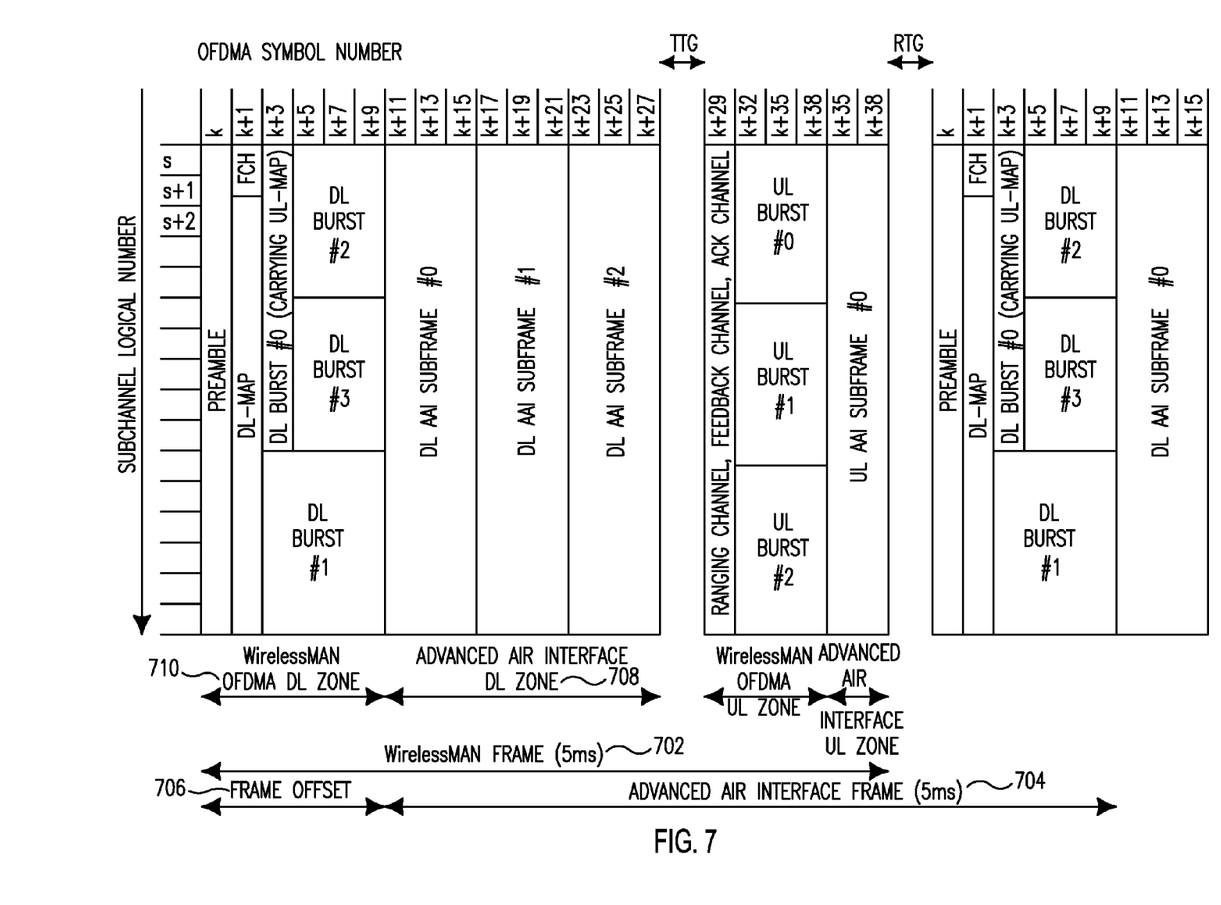
FIG. 7 is an example of 802.16m TDD frame supporting legacy 802.16e operation.

One alternative may use some functionality defined for 802.16m's legacy mode, which allows 802.16e devices to work with 802.16m base stations by allocating some subframe time to 802.16e frame structures. FIG. 7 illustrates an example of 802.16m TDD frame supporting 802.16e operation.

In FIG. 7, the WirelessMAN-OFDMA and the Advanced Air Interface (AAI) frames 702 and 704, respectively, may be offset by a fixed number of AAI subframes by frame offset 706, where FRAME_OFFSET=1, 2, ..., K. Regarding the TDD frame structure supporting WirelessMAN-OFDMA, all ABSs with the same center frequency within the same deployment region shall have the same FRAME_OFFSET value regardless of ABS type. When the Advanced Air Interface frames 704 support the WirelessMAN-OFDMA for 5 MHz, 10 MHz, 20 MHz channel bandwidths, all AAI subframes in the Advanced Air Interface DL Zone 708 are type-1 AAI subframes. The number of symbols in the first WirelessMAN-OFDMA DL Zone 710 is 5+6×(FRAME_OFFSET−1). When the Advanced Air Interface frames 704 support the WirelessMAN-OFDMA for the 8.75 MHz channel bandwidth with 15 UL OFDM symbols and for the 7 MHz channel bandwidth with 12 UL OFDM symbols, all AAI subframes in the Advanced Air Interface DL Zone 708 are type-1 AAI subframes.

The number of symbols in the first WirelessMAN-OFDMA DL Zone 701 may be 3+6×(FRAME_OFFSET−1) for 8.75 MHz and 9+6×(FRAME_OFFSET−1) for 7 MHz. The maximum value of parameter K is equal to the number of DL AAI subframes minus two. The minimum value of FRAME_OFFSET shall be two for 8.75 MHz channel bandwidth, and the minimum value of FRAME_OFFSET shall be one for other bandwidths.

In the DL, a subset of DL AAI subframes may be dedicated to the WirelessMAN-OFDMA operation to enable one or more WirelessMAN-OFDMA DL zones 710. The subset may include the first WirelessMAN-OFDMA DL zone 710 to support the transmission of the preamble, FCH and MAP.

The subset of DL AAI subframes dedicated to the WirelessMAN-OFDMA operation may comprise either one group of contiguous DL AAI subframes or two separate groups of contiguous DL AAI subframes.

When comprising the two separate groups, the second group may include the last DL AAI subframe. Data bursts for the R1 MSs may not be transmitted in the DL AAI subframes for operation of the Advanced Air Interface. Those DL AAI subframes shall be indicated as a DL time zone by transmitting an STC_DL_ZONE_IE( ) with the Dedicated Pilots field set to 1 in the DL-MAP messages.

DL/UL MAPs and bursts for AMS may be scheduled in either zone (Advanced Air Interface DL Zone 708 or WirelessMAN-OFDMA DL Zone 710) according to the mode (Advanced Air Interface or WirelessMANOFDMA) with which the AMS is connected to the ABS, but shall not be scheduled in both zones in the same frame.

In the UL, the following configurations may be applicable. In FDM mode, a group of subcarriers (subchannels), spanning the entire UL transmission, is dedicated to the WirelessMAN-OFDMA operation. The remaining subcarriers, denoted the Advanced Air Interface UL subchannels group and forming the Advanced Air Interface UL AAI subframes, are dedicated to the Advanced Air Interface operation.

In case that PUSC subchannel rotation is activated for R1 MSs, ABS shall transmit TLV 157 of the UCD i.e., "UL allocated subchannels bitmap" for MSs to recognize the available subchannels. Available subchannels for R1 MSs shall be logically contiguous in terms of subchannel index and shall not be allocated for AMSs.

Data bursts from the R1 MSs may not be transmitted in the UL subchannels group for operation of the Advanced Air Interface. Control channels and bursts for AMS may be scheduled in either group of UL subchannels (group of UL subchannels for Advanced Air Interface or WirelessMAN-OFDMA) according to the mode (Advanced Air Interface or WirelessMAN-OFDMA) with which the AMS is connected to the ABS, but may not be scheduled in both groups in the same frame.

Figure 8:
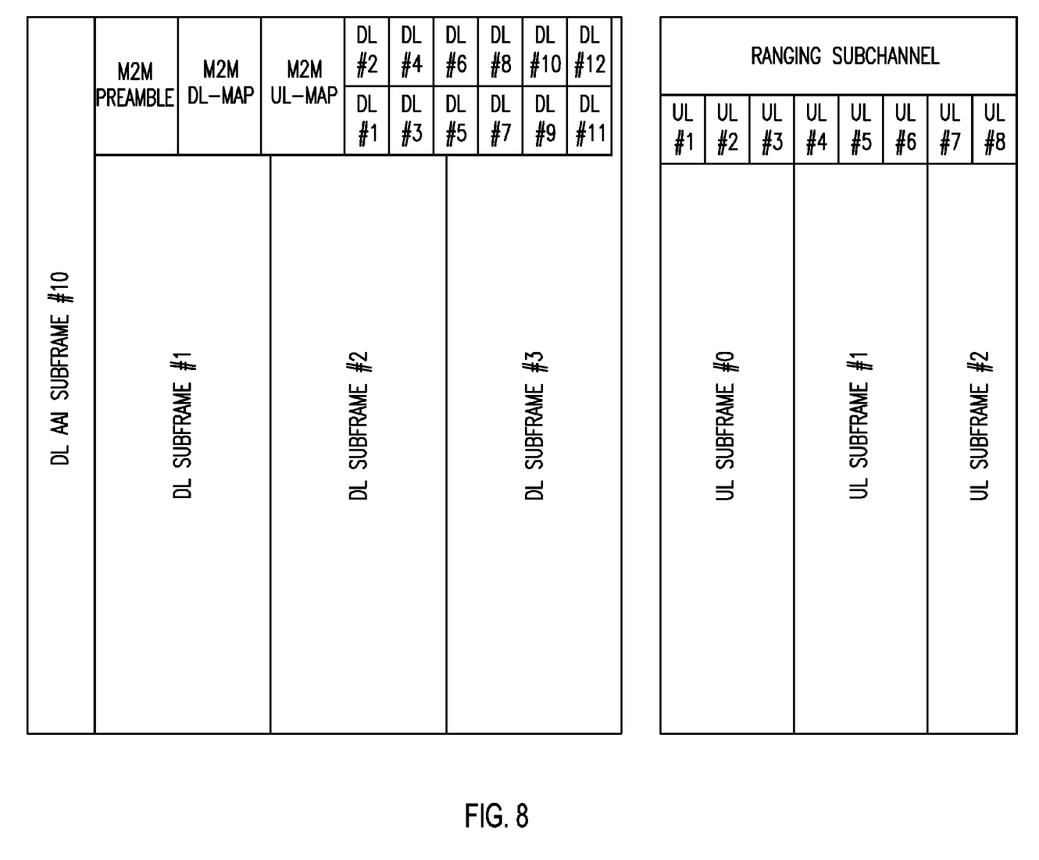
FIG. 8 is an example of 802.16m with wireless MAN-OFDMA legacy frame operating for NB-M2M.

FIG. 8 is an example of an 802.16m with wireless MAN-OFDMA legacy frame operating for NB-M2M. While the legacy mode in 802.16m is defined for use of the full bandwidth, a narrow band portion as shown in FIG. 8 may be used to insert a legacy frame for NB-M2M devices while the remaining bandwidth is used for 802.16m devices. This is similar to the technique used for 802.16e systems, except the NB-M2M allocation is accommodated by allocating a time/frequency block with a narrow bandwidth, treating that block as a narrowband 802.16e UL/DL area, and simultaneously using the remaining bandwidth for 802.16m communications. Any control structures or other system definitions prescribed for the 802.16e version may apply to the WirelessMAN-OFDM mode of 802.16m.

Another alternative may define a narrowband 802.16m configuration, similar to what was done in 802.16e for the 128-FFT, and allocate a portion of the frame for an NB-M2M structure, again, similar to what was done for 802.16e. While this option requires more structural additions to 802.16m, it would allow a "pure" 802.16m system without the need for legacy support.

Similar supports to those described above may be used with an 802.16m ABS (Advanced BaseStation) to accommodate the NB-M2M operation in the 802.16m systems.

Similarly, the 802.16m Advanced Mobile Station (AMS) may be designed to skip the DL/UL allocations that are not destined to it.

The NB-M2M devices transmit and receive in a narrowband channel, e.g., 1.25 MHz, and are designed to be cost-effective and power-efficient for the M2M applications with low data traffic and small data bursts. The NB-M2M devices may be supported in some existing wideband wireless access systems, such as, 802.16e, 802.16m, and 3GPP LTE/LET-A, in addition to NB-M2M access systems.

The following discusses the NB-M2M devices supported in the existing wideband wireless access systems, including but not limited to 802.16e, 802.16m, and 3GPP LTE/LTE-A. The NB-M2M devices as a new subscriber type in the 802.16p systems are proposed. Since both 802.16e OFDMA systems and 802.16m systems are considered as baseline systems for the 802.16p development, the proposed NB-M2M devices need to be supported in the 802.16e-based 802.16p systems and the 802.16m-based 802.16p systems.

In 802.16p systems, the NB-M2M devices may transmit and receive in the NB-M2M regions as allocated by the BS, as shown in the example in FIG. 4. The NB-M2M devices may be designed to process the radio frames with discontinuous DL areas (frequency domain*time domain) that they may or may not receive/decode correctly and discontinuous UL areas that they may or may not transmit.

The NB-M2M devices may support the subscriber side narrowband PHY design and processing, to communicate with the BS in the NB-M2M region as described above.

The NB-M2M devices may support the 802.16 MAC design and procedures for the basic support of NB-M2M operation in 802.16p systems. In addition, the NB-M2M devices may support the capability negotiation signaling and procedures with the BS to initialize any NB-M2M specific MAC enhancements as described above. The NB-M2M devices can also support the MAC enhancements as described above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Embodiments

1. A method for use in a wireless communication system, the method comprising allocating a narrowband structure inside of a wideband structure to access a frame structure, wherein the narrowband structure is allocated using a base station such that the narrowband structure includes spectrum for Machine-to-Machine (M2M) communications.

2. The method as in embodiment 1, wherein s preamble for a band is embedded within s downlink frame to allow the M2M device to synchronize to s base station.

3. The method as in any of the preceding embodiments, wherein the narrowband structure is allocated such that the base station may communicate with M2M devices in channels with narrowband bandwidth.

4. The method as in any of the preceding embodiments, wherein the narrowband structure is allocated to satisfy quality of service (QoS) requirements for M2M communications and to minimize impact on other devices in the wireless communication system.

5. The method as in any of the preceding embodiments, wherein the base station supports a narrowband (NB)-M2M region specific physical layer (PHY).

6. The method as in any of the preceding embodiments, wherein the base station supports an NB-M2M device specific medium access control layer (MAC).

7. The method as in any of the preceding embodiments further comprising using a localized subcarrier allocation in LTE.

8. The method as in any of the preceding embodiments, wherein a subcarrier mapping is used to allocate a portion of the bandwidth to narrow band M2M (NB-M2M) devices 9. The method as in any of the preceding embodiments, wherein a regular frame structure is used.

10. The method as in any of the preceding embodiments, wherein the narrow band structure starts with an M2M preamble, followed by data.

11. The method as in any of the preceding embodiments, wherein any downlink transmissions specific to M2M devices in the narrowband structure are identified by an M2M map.

12. The method as in any of the preceding embodiments, wherein an M2M uplink space within a special narrowband structure is allocated by the base station and used by M2M devices.

13. The method as in any of the preceding embodiments, wherein a sampling frequency is calculated as $F_s$=floor (n·BW/8000)·8000, where n is the sampling factor.

14. The method as in any of the preceding embodiments wherein a subcarrier spacing is calculated as $\Delta f = F_s/N_{FFT}$, where $N_{FFT}$ is the smallest power of two greater than the number of subcarriers in use.

15. The method as in any of the preceding embodiments, wherein the subcarrier spacing does not match the value for the band and changes to the band parameters are made.

16. The method as in any of the preceding embodiments, wherein the preamble for a band is embedded within the downlink frame to allow the M2M device to synchronize to the base station.

17. The method as in any of the preceding embodiments, wherein NB-M2M traffic is supported in a Time Division Multiplexing (TDM) manner.

18. The method as in any of the preceding embodiments, wherein NB-M2M traffic is supported in a Frequency Division Multiplexing (FDM) manner.

19. The method as in any of the preceding embodiments, wherein a Frame Control Header (FCH) is included in the frame to allow NB mobile stations to use.

20. A method for use in a wireless communications system, the method comprising: transmitting M2M signals, the signals are transmitted in an allocated narrow portion of bandwidth in a wideband structure, wherein the allocated portion of the bandwidth is allocated to narrow band M2M (NB-M2M) devices using a low complexity narrowband technology to access a frame structure within an existing wideband deployment.

What is claimed is:

1. A method for use in a wireless communication system comprising at least one base station, capable of Machine-to-Machine (M2M) communications, comprising at least one processor, the method comprising:

allocating, with the at least one base station processor, a narrowband structure, comprising spectrum for M2M communications, inside of a wideband structure for downlink communications with an M2M device and in an AMC subframe zone; and allocating, with the at least one base station processor, an M2M preamble within a downlink frame in the narrowband structure for the M2M device to synchronize with the at least one base station.

2. The method of claim 1, further comprising allocating, with the base station at least one processor, the M2M preamble in a Band Adaptive Modulation and Coding (AMC) subframe zone.

3. The method of claim 1, wherein the wideband structure comprises a downlink subframe comprising a preamble, a PUSC zone, and an AMC zone and the method further comprises allocating, with the base station at least one processor, the M2M preamble in a Band Adaptive Modulation and Coding (AMC) subframe zone.

4. The method of claim 1, further comprising, allocating, with the base station at least one processor, a M2M DL-MAP in the narrowband structure.

5. The method of claim 4, further comprising, allocating, with the base station at least one processor, the M2M DL-MAP in the narrowband structure after the M2M preamble and allocating a portion of the narrowband structure after the M2M preamble for data transmission.

6. The method of claim 1, further comprising, allocating, with the base station at least one processor, a frame control header in the narrowband structure.

7. The method of claim 1, further comprising, allocating, with the base station at least one processor, a frequency control header and a M2M DL-MAP in the narrowband structure after the M2M preamble and allocating the M2M preamble, frequency control header, and the M2M DL-MAP in the AMC zone of a downlink subframe.

8. The method of claim 1, further comprising allocating, with the at least one base station processor, in the narrowband structure, an uplink subframe comprising an AMC zone for uplink M2M communications.

9. The method of claim 1, further comprising, the at least one base station processor, using a subcarrier mapping, to allocate a portion of the narrowband structure for M2M devices.

10. A wireless communications device, for use in a wireless communication system base station for Machine-to-Machine (M2M) communications, comprising:

a processor with executable instructions for allocating a narrowband structure, comprising spectrum for M2M communications, inside of a wideband structure for downlink communications with an M2M device and in an AMC subframe zone; and allocating, an M2M preamble within a downlink frame in the narrowband structure for the M2M device to synchronize with the at least one base station.

11. The wireless communications device of claim 10, wherein the processor comprises executable instructions for allocating the M2M preamble in a Band Adaptive Modulation and Coding (AMC) subframe zone.

12. The wireless communications device of claim 10, wherein the wideband structure comprises a downlink subframe comprising a preamble, a PUSC zone, and an AMC zone and wherein the processor comprises executable instructions for allocating the M2M preamble in a Band Adaptive Modulation and coding (AMC) subframe zone.

13. The wireless communications device of claim 10, wherein the processor further comprises executable instructions for allocating a M2M DL-MAP in the narrowband structure.

14. The wireless communications device of claim 13, wherein the processor further comprises executable instructions for allocating the M2M DL-MAP in the narrowband structure after the M2M preamble and for allocating a portion of the narrowband structure after the M2M preamble for data transmission.

15. The wireless communications device of claim 10, wherein the processor further comprises executable instructions for allocating a frame control header in the narrowband structure.

16. The wireless communications device of claim 10, wherein the processor further comprises executable instructions for allocating a frequency control header and a M2M DL-MAP in the narrowband structure after the M2M preamble and for allocating the M2M preamble, frequency control header and the M2M DL-MAP in the AMC of a downlink sub frame.

17. The wireless communications device of claim 10, wherein the processor further comprises executable instructions for allocating, in the narrowband structure, an uplink subframe comprising an AMC zone for uplink M2M communications.

18. The wireless communications device of claim 10, wherein the processor further comprises executable instructions for, using a subcarrier mapping, to allocate a portion of the narrowband structure for M2M devices.

* * * * *